(12) United States Patent
Jeganathan et al.

(10) Patent No.: US 9,145,651 B2
(45) Date of Patent: Sep. 29, 2015

(54) DURABLE, THICK WATERBORNE LATEX PAINT COMPOSITIONS FOR HIGHWAY MARKINGS

(71) Applicants: Suruliappa Jeganathan, Chadds Ford, PA (US); Chris Davies, Plymouth Meeting, PA (US); Kevin Goforth, Chester Springs, PA (US)

(72) Inventors: Suruliappa Jeganathan, Chadds Ford, PA (US); Chris Davies, Plymouth Meeting, PA (US); Kevin Goforth, Chester Springs, PA (US)

(73) Assignee: POTTERS INDUSTRIES, LLC, Wilmington, DE (US)

( * ) Notice: Subject to any disclaimer, the term of this patent is extended or adjusted under 35 U.S.C. 154(b) by 0 days.

(21) Appl. No.: 14/024,035

(22) Filed: Sep. 11, 2013

(65) Prior Publication Data

US 2014/0321911 A1  Oct. 30, 2014

Related U.S. Application Data

(60) Provisional application No. 61/701,135, filed on Sep. 14, 2012.

(51) Int. Cl.
*E01F 9/04* (2006.01)
*C09D 5/33* (2006.01)

(52) U.S. Cl.
CPC .............. *E01F 9/041* (2013.01); *C09D 5/004* (2013.01)

(58) Field of Classification Search
CPC ............. E01F 9/041; E01F 9/044; E01F 9/08; E01F 9/081; C09D 5/004
USPC ................... 404/12, 14, 75, 94; 524/493, 494
See application file for complete search history.

(56) References Cited

U.S. PATENT DOCUMENTS

| | | | | |
|---|---|---|---|---|
| 3,030,251 | A | * | 4/1962 | La Bore et al. .............. 428/40.1 |
| 3,036,928 | A | * | 5/1962 | Poole .......................... 427/163.4 |
| 3,592,679 | A | * | 7/1971 | Tully et al. .................... 428/206 |
| 4,090,887 | A | * | 5/1978 | Marquisee et al. ........... 106/409 |
| 4,132,560 | A | | 1/1979 | Marquisee et al. |
| 5,340,870 | A | | 8/1994 | Clinnin et al. |
| 5,544,972 | A | | 8/1996 | Boldt |
| 5,599,133 | A | * | 2/1997 | Costello et al. ................. 404/72 |
| 5,824,734 | A | | 10/1998 | Yang |
| 5,922,398 | A | | 7/1999 | Hermes et al. |
| 5,947,632 | A | | 9/1999 | Pirotta et al. |
| 6,013,721 | A | | 1/2000 | Schall et al. |
| 6,132,132 | A | | 10/2000 | Pirotta et al. |
| 6,333,068 | B1 | | 12/2001 | Durand et al. |
| 6,413,011 | B1 | | 7/2002 | Sobczak et al. |
| 6,475,556 | B1 | | 11/2002 | Sobczak et al. |
| 6,645,552 | B1 | | 11/2003 | Schall et al. |
| 2007/0166438 | A1 | * | 7/2007 | Kitahata et al. ............... 426/242 |
| 2010/0112340 | A1 | | 5/2010 | Bell |
| 2010/0283007 | A1 | * | 11/2010 | Robinson ................. 252/301.36 |

FOREIGN PATENT DOCUMENTS

| | | |
|---|---|---|
| EP | 0525977 A1 | 2/1993 |
| EP | 0791637 A2 | 8/1997 |
| EP | 1158028 A1 | 11/2001 |

OTHER PUBLICATIONS

European Search Report for European Application No. 14160118.7-1302 dated Dec. 16, 2014.

* cited by examiner

*Primary Examiner* — Raymond W Addie
(74) *Attorney, Agent, or Firm* — Buchanan Ingersoll & Rooney PC

(57) ABSTRACT

A highway marking paint is provided formed from a waterborne latex paint and porous silica. The silica enables the paint to achieve sufficient viscosity to permit the application of a highway marking of at least 40 mil and preferably at least 120 mil. The highway marking paint can also include retroreflective glass beads. Optionally, the highway marking paint further includes an acrylic polymer emulsion.

17 Claims, No Drawings

DURABLE, THICK WATERBORNE LATEX PAINT COMPOSITIONS FOR HIGHWAY MARKINGS

CROSS-REFERENCE TO RELATED APPLICATIONS

This application claims priority to U.S. Provisional Patent Application No. 61/701,135 filed in the United States Patent and Trademark Office on Sep. 14, 2012 and is incorporated herein by reference.

BACKGROUND OF THE INVENTION

1. Field of the Invention

The present invention relates to the field of highway marking paints and more particularly to the field of rapidly drying waterborne latex paint compositions.

2. Description of the Related Art

Two desirable features for highway marking paint compositions are that the compositions are durable and that they dry rapidly. Because of the manpower involved in marking roadways and the associated material costs, it is desirable that a highway marking last a minimum of 4 years and more preferably up to 7 years or longer. Moreover, it is highly desirable that the highway marking dry rapidly to prevent the paint from running across the roadway and to minimize the disruption to traffic flow while the highway marking is being applied.

One technique to enhance durability is to apply a thicker layer of paint. A thin paint layer of 25 mil or less will likely have a 1 year life and at best 2-3 years. A thicker paint layer of 60 mil or greater will typically last for 4-7 years. Accordingly, there is a strong desire to apply a thicker paint layer when marking highways.

The main constraint to applying a thick highway paint layer is the drying time of the paint. Thermoplastic materials that are heated immediately after application to set the paint layer have regularly been used to obtain the desired thick highway paint layer. However, because of its cost and need for extra machinery, there has been an effort to develop a less expensive paint system. Several of these systems are discussed below.

U.S. Pat. No. 6,013,721 describes the use of polymer containing one acid and one amine functionality to improve the storage stability and drying time of the waterborne paint. The system was able to produce a paint layer having a wet film thickness of 14 mil.

U.S. Pat. No. 5,340,870 describes the use of a filler such as calcium carbonate added to an acrylic binder to increase the viscosity and dry time of the paint. The filler is added at a 60-75% ratio relative to the binder. Because of the high content of the inorganic filler the paint dries fast but its storage stability is poor and it does not give durable markings once applied on roads.

U.S. Pat. No. 6,132,132 discloses various types of drying agents including ion exchange resins, superabsorbent gels such as Sumica gel, and hollow-sphere polymers such as Ropaque® OP-62 to improve the drying time of the waterborne paint for traffic markings.

U.S. Pat. No. 6,333,068 describes the use of metallic polychloride and synthetic polyamides as accelerators. These accelerators dry the 15 mil thickness waterborne paint fast.

U.S. Pat. No. 6,413,011 describes multicomponent fast drying waterborne coatings of 13-15 mil wet film thickness. These coatings include extenders such as calcium carbonate, talc, silica and silicates as well as fillers such as glass beads, quartz and sand. The disclosed extenders are hard dense materials.

U.S. Pat. No. 6,475,556 discusses the need for fast drying of thick films of waterborne paint above 20 mil and up to 120 mil in thickness. However methods are disclosed that only dry films of 20-40 mil wet thickness. An ion exchange resin is used as the drying agent and a small amount of polyamine resin is added to the binder as well.

U.S. Pat. No. 6,645,552 describes the use of ion exchange resin as drying agent for waterborne paint with wet mil thickness of 30 mil. The paint is applied as a wet on wet or layer by layer coating; with each layer being 15 mil.

U.S. Pat. No. 5,922,398 describes the use of pendant amino-containing polymer along with acrylic polymers so that the pH is adjusted to provide for fast drying. The coatings achieved with this system are described as having a wet film thickness of 15 mil.

Although the systems discussed in the patents above were able to speed up drying time of the highway paint, they were not able to achieve waterborne traffic markings having a thickness greater than 30 mil wet thickness. At such a thickness, the underlying roadway will need to be repainted on an annual basis. There is a need for a waterborne traffic marking system which has greater thickness and increased durability.

SUMMARY OF THE INVENTION

Highly durable thick lane markings have been typically applied by using thermoplastic binders at 80-120 mil wet thickness which are applied at high temperature (300-400° F.). Waterborne paint on the other hand is applied at ambient temperatures and is easier to make traffic markings. However, waterborne paint has not been used at these thicknesses because they require more time to dry and as the wet film thickness increases the liquid paint, although viscous, tends to flow sideways and run. The present invention provides a waterborne paint composition for highway traffic markings which can be applied at greater thicknesses than the current waterborne latex paint. The present invention also enables application of retroreflective elements on the thick paint layer to achieve retroreflective traffic markings.

The present invention is a waterborne paint of 40-120 mil wet thickness with improved durability and retroreflectivity. The paint composition uses regular waterborne paint, retroreflective glass beads, porous silica, and optionally an acrylic emulsion in water. The porous silica helps to form a highly viscous paint composition with glass beads through hydrogen bonding and reducing the pH of the latex paint. This paint provides very cost effective and environmentally friendly traffic markings of high thickness and an alternative to thermo plastic markings which requires high temperature to apply and are very expensive compared to waterborne paint.

Existing waterborne traffic markings obtain faster drying times by using ion exchange resins. Even with such faster drying times, these existing systems can only achieve relatively thin paint layers of 15-30 mil wet thickness. The present invention uses retroreflective glass beads, porous silica, and optionally an acrylic emulsion in water to apply a thick paint layer having a wet thickness of 40-120 mil with improved durability. The use of acrylic emulsion is optional depending on the road conditions.

DETAILED DESCRIPTION OF THE PREFERRED EMBODIMENTS

The present invention describes the use of waterborne acrylic latex paint, glass beads, and silica materials with low porosity, and acrylic polymer emulsion to develop a paint composition that can be applied at greater thicknesses than regular waterborne latex paints. Retroreflective elements are added on top of the layer to have retroreflecting highway markings on roads or other surfaces.

The waterborne latex paint used in this invention can be the regular paint used for highway traffic markings. Examples include paints from Sherwin Williams or Ennis.

The glass beads added to the paint are retroreflective beads having a particle size ranging from 20 to 200 US Mesh. The advantage of providing these beads inside the paint layer is to increase the retroreflectivity as the paint begins to wear.

Porous silica when added to the paint helps to increase the viscosity of the paint through strong hydrogen bonding with acrylic polymer and water. This also reduces the pH of the paint which is usually basic. Porous silica is acidic with pH of 6-6.5. It is presently believed that the acidic nature of the porous silica as well as the pores permits the present paint system to set up quicker and allow greater thicknesses. Preferably, the porous silica has a pore volume in the range of 1.0 cc/g to 1.9 cc/g and preferably between 1.08 cc/g and 1.78 cc/g. The porous silica has a surface area in the range of from 300 $m^2/g$ to 400 $m^2/g$, preferably between 320 $m^2/g$ and 380 $m^2/g$.

When these three components, paint, glass beads and porous silica, are mixed, the overall formulation becomes more viscous than the paint, thus allowing the formulation to be sprayed or drawn down on surfaces like asphalt or others so that a wet film thickness of 60-120 mil can be achieved. Addition of an acrylic water based binder like Ropaque® Ultra EF, Rovene® 6018, and Rovene® 6020 helps the paint layer to dry easily without any cracks.

The ratio of porous silica to paint can range from 5:300 to 30:300, preferably between 10:300 and 20:300. The ratio of acrylic polymer emulsion to paint can be 5:300 to 30:300, preferably between 10:300 and 20:300.

The retroreflective glass beads can be dropped over or otherwise mixed with the 60-120 mil thick paint layer to achieve retroreflectivity. Such glass beads include standard M247, Ultra 1.9®, VisiMax®, and Visibead®, all trademarks of Potters Industries.

Since the present invention deals with thick waterborne paint layer, bigger beads like Visibead® can also be added in the paint formulation that helps to maintain retroreflectivity better than small beads as the paint begins to wear. In addition, such larger beads also provide improved wet night visibility.

EXAMPLES

Example 1

In a plastic beaker, 300 g of Sherwin Williams® white paint was added followed by 60 g of glass beads (80-200 US mesh) and 15 g of porous silica (18-80 US mesh). After mixing, the resulting paint composition was drawn down on a 6×18 inch glass panel using a blade with 100 mil gap. Standard M247 glass beads (coated with Potters® AC-110 formulation) were dropped over the paint layer and the composition was dried at room temperature.

In place of Standard M247 beads, other retro reflective beads such as Visibead®, VisiMax®, Ultra 1.9® beads can also be dropped.

Example 2

In a plastic beaker, 300 g of Sherwin Williams® yellow paint was added followed by 60 g of glass beads (80-200 US mesh) and 15 g of porous silica (18-80 US mesh). After mixing, the resulting paint composition was drawn down on a 6×18 inch glass panel using a blade with 100 mil gap. Standard M247 glass beads (coated with Potters® AC-110 formulation) were dropped over the paint layer and the composition was dried at room temperature.

In place of Standard M247 beads, other retro reflective beads such as Visibead®, VisiMax®, Ultra 1.9® beads can also be dropped.

Example 3

In a plastic beaker, 300 g of Sherwin Williams® white paint was added followed by 60 g of glass beads (80-200 US mesh) and 15 g of porous silica (18-80 US mesh). After mixing, the resulting paint composition was drawn down on a 6×18 inch glass panel using a blade with 100 mil gap. A combination of two retroreflective beads, Standard M247 glass beads (coated with Potters AC-110 formulation) and a high refractive index (1.9) 50/80 US mesh bead, were dropped over the paint layer and the composition was dried at room temperature.

In place of Standard M247 beads, other retro reflective beads such as Visibead®, VisiMax®, Ultra 1.9® beads can also be dropped.

Example 4

In a plastic beaker, 300 g of Sherwin Williams® yellow paint was added followed by 60 g of glass beads (80-200 US mesh) and 15 g of porous silica (18-80 US mesh). After mixing, the resulting paint composition was drawn down on a 6×18 inch glass panel using a blade with 100 mil gap. A combination of two retroreflective beads, Standard M247 glass beads (coated with Potters AC-110 formulation) and a high refractive index (1.9) 50/80 US mesh bead, were dropped over the paint layer and the composition was dried at room temperature.

In place of Standard M247 beads, other retro reflective beads such as Visibead®, VisiMax®, Ultra 1.9® beads can also be dropped.

Example 5

In a plastic beaker, 300 g of Sherwin Williams® yellow paint was added followed by 60 g of Visibead® beads and 15 g of porous silica (18-80 US mesh). After mixing, the resulting paint composition was drawn down on a 6×18 inch glass panel using a blade with 100 mil gap. A combination of two retroreflective beads, Standard M247 glass beads (coated with Potters AC-110 formulation) and a high refractive index (1.9) 50/80 US mesh bead were dropped over the paint layer and the composition was dried at room temperature.

In place of Standard M247 beads, other retro reflective beads such as Visibead®, VisiMax®, Ultra 1.9® beads can also be dropped.

Example 6

In a plastic beaker, 300 g of Sherwin Williams® white paint was added followed by 60 g of glass beads (80-200 US mesh), 15 g of porous silica (18-80 US mesh), and 15 g of acrylic emulsion Ropaque® Ultra EF (DOW). After mixing, the resulting paint composition was drawn down on a 6×18 inch glass panel using a blade with 100 mil gap. Standard M247 glass beads (coated with Potters® AC-110 formulation) were dropped over the paint layer and the composition was dried at room temperature.

In place of Standard M247 beads, other retro reflective beads such as Visibead®, VisiMax®, Ultra 1.9® beads can also be dropped.

Instead of Ropaque® acrylic emulsion, other acrylic emulsion like Rovene® 6018 or Rovene® 6020 can also be used.

Example 7

In a plastic beaker, 300 g of Sherwin Williams® yellow paint was added followed by 60 g of glass beads (80-200 US mesh), 15 g of porous silica (18-80 US mesh), and 15 g of acrylic emulsion Ropaque® Ultra EF (DOW). After mixing, the resulting paint composition was drawn down on a 6×18 inch glass panel using a blade with 100 mil gap. Standard M247 glass beads (coated with Potters® AC-110 formulation) were dropped over the paint layer and the composition was dried at room temperature.

In place of Standard M247 beads, other retro reflective beads such as Visibead®, VisiMax®, Ultra 1.9® beads can also be dropped.

Instead of Ropaque® acrylic emulsion, other acrylic emulsion like Rovene® 6018 or Rovene® 6020 can also used.

Example 8

Flow Properties

One hundred and fifty grams of Sherwin Williams waterborne latex paint with or without either glass beads or porous silica gel was placed in a metal can and then the can was placed at a 45 degree angle and the contents were allowed to flow and captured in another container placed below. The weight of the material flowed to the second can was determined which is the flow rate. The higher the flow rate percentage, the less viscous are the contents. The low viscosity allows the formulation to be applied at higher wet mil thickness. Table 1 illustrates the effect of silica gel on the viscosity of the formulation.

TABLE 1

| Formulation | Flow rate |
| --- | --- |
| SW paint (150 g) | 89% |
| SW paint (150 g) + 30 g M247 beads | 89% |
| SW paint (150 g) + 30 g M247 beads + 7.5 g porous silica gel | 77% |

Example 9

Road Trials

Trial 1: At the truck speed of 1 mph, the product described Example 1 (60 g of glass beads (80-200 US mesh) and 15 g of porous silica (18-80 US mesh)) was injected into the paint stream at 0.23-0.36 kg/liter of paint. The thickness of the traffic markings was at 50-55 wet mil and the drying time was about 30 min. The drop on bead for retro reflectivity on this marking was the standard M247 AC110 glass beads (Potters Industries).

Trial 2: At the truck speed of 2 mph, the product described in Example 1 (60 g of glass beads (80-200 US mesh) and 15 g of porous silica (18-80 US mesh)) was injected into the paint stream at 0.6 kg/liter of paint. The thickness of the traffic markings was at 40-50 wet mil and the drying time was about 20 min. The drop on bead for retro reflectivity on this marking was the standard M247 AC110 glass beads (Potters Industries).

Trial 3: At the truck speed of 3 mph, the product described in Example 1 (60 g of glass beads (80-200 US mesh) and 15 g of porous silica (18-80 US mesh)) was injected into the paint stream at 1.2 kg/liter of paint. The thickness of the traffic markings was at 60-70 wet mil and the drying time was about 5 min. The drop on bead for retro reflectivity on this marking was the standard M247 AC110 glass beads (Potters Industries).

Any documents referenced above are incorporated by reference herein. Their inclusion is not an admission that they are material or that they are otherwise prior art for any purpose.

Although the invention is illustrated and described herein with reference to specific embodiments, the invention is not intended to be limited to the details shown. Rather, various modifications may be made in the details within the scope and range of equivalents of the claims and without departing from the invention.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein.

All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. Use of the term "about" should be construed as providing support for embodiments directed to the exact listed amount. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

The invention claimed is:
1. A highway marking paint comprising:
 a. waterborne latex paint; and
 b. porous silica having a particle size ranging from 18 to 80 US Mesh whereby said porous silica provides controlled drying of said paint.

2. The highway marking paint of claim 1 further comprising retroreflective glass beads.

3. The highway marking paint of claim 2 wherein said retroreflective glass beads have a particle size ranging from 20 to 200 US Mesh.

4. The highway marking paint of claim 1 wherein the ratio of silica to paint is in the range of 5:300 to 30:300.

5. The highway marking paint of claim 1 further comprising an acrylic polymer emulsion.

6. The highway marking paint of claim 5 wherein the ratio of acrylic polymer emulsion to paint is in the range of 5:300 to 30:300.

7. A highway marking having a thickness of at least 40 mil comprising:
   a. waterborne latex paint;
   b. porous silica having a particle size ranging from 18 to 80 US Mesh whereby said porous silica provides controlled drying of said paint.

8. The highway marking of claim 7 further comprising retroreflective glass beads.

9. The highway marking of claim 8 wherein said retroreflective glass beads have a particle size ranging from 20 to 200 US Mesh.

10. The highway marking of claim 9 wherein the ratio of silica to paint is in the range of 10:300 to 20:300.

11. The highway marking of claim 7 further comprising an acrylic polymer emulsion.

12. The highway marking of claim 11 wherein the ratio of acrylic polymer emulsion to paint is in the range of 10:300 to 20:300.

13. The highway marking of claim 7 having a thickness of at least 60 mil.

14. The highway marking of claim 13 having a thickness of at least 90 mil.

15. The highway marking of claim 14 having a thickness of at least 120 mil.

16. A method of applying a highway marking comprising the steps of:
   a. dispensing a stream of a waterborne latex paint,
   b. forming a paint composition by directing into said stream of a waterborne latex paint a stream of a porous silica having a particle size ranging from 18 to 80 US Mesh whereby said porous silica flows into said paint and provides controlled drying of said paint, and
   c. applying said paint composition to a transportation corridor at a thickness of at least 40 mil.

17. The method of claim 16 wherein said paint composition further includes retroreflective glass beads and an acrylic polymer emulsion.

* * * * *